United States Patent
Wang et al.

(10) Patent No.: US 12,411,907 B1
(45) Date of Patent: Sep. 9, 2025

(54) METHOD AND APPARATUS FOR ARRANGING SPARSE SENSOR EMBEDDED WITH PHYSICAL INFORMATION, AND DEVICE

(71) Applicant: Harbin Institute of Technology, Shenzhen, Shenzhen (CN)

(72) Inventors: Ying Wang, Shenzhen (CN); Biqi Chen, Shenzhen (CN)

(73) Assignee: Harbin Institute of Technology, Shenzhen, Shenzhen (CN)

(*) Notice: Subject to any disclaimer, the term of this patent is extended or adjusted under 35 U.S.C. 154(b) by 0 days.

(21) Appl. No.: 19/031,488

(22) Filed: Jan. 18, 2025

(30) Foreign Application Priority Data

Jun. 13, 2024 (CN) .......................... 202410756556.7

(51) Int. Cl.
  *G06F 17/11* (2006.01)
  *G06F 17/12* (2006.01)
  *G06F 17/16* (2006.01)
(52) U.S. Cl.
  CPC .............. *G06F 17/11* (2013.01); *G06F 17/12* (2013.01); *G06F 17/16* (2013.01)
(58) Field of Classification Search
  CPC ........... G06F 17/11; G06F 17/12; G06F 17/16
  See application file for complete search history.

(56) References Cited

PUBLICATIONS

J. Zhou et al., Operational modal analysis with compressed measurements based on prior information, Measurement 211, 112644, sciencedirect, 2023 (Year: 2023).*
W. Tian et al., Efficient Acquisition Method for Marine Monitoring Data Based on Compressed Sensing, Special Section on Intelligent Data Sensing, Collection and Dissemination in Mobile Computing, IEEE Access, 2019 (Year: 2019).*
S. Yang et al., Compressive Hyperspectral Imaging via Sparse Tensor and Nonlinear Compressed Sensing, IEEE Transactions on Geoscience and Remote Sensing, vol. 53, Mo. 11, 2015 (Year: 2015).*
W. Wang et al., Intelligent throat polyp detection with separable compressive sensing, EURASIP Journal on Advances in Signal Processing, Springer, 2014 (Year: 2014).*

* cited by examiner

*Primary Examiner* — Emily E Larocque
(74) *Attorney, Agent, or Firm* — WCF IP

(57) ABSTRACT

Provided are a method and an apparatus for arranging a sparse sensor embedded with physical information, and a device. The method includes obtaining prior information of a target structure and extracting an adaptive basis matrix of the prior information; constructing a problem of an optimal sparse measurement matrix by using a compressed sensing method based on the adaptive basis matrix, and solving the problem of the optimal sparse measurement matrix to obtain the optimal sparse measurement matrix; and determining, based on the optimal sparse measurement matrix, a sensor arrangement strategy corresponding to the target structure, and arranging a sensor for the target structure based on the sensor arrangement strategy. By using the compressed sensing method to determine the optimal sparse measurement matrix, data collected by each sensor has a greatest correlation for solving a specific problem.

6 Claims, 5 Drawing Sheets

METHOD AND APPARATUS FOR ARRANGING SPARSE SENSOR EMBEDDED WITH PHYSICAL INFORMATION, AND DEVICE

CROSS REFERENCE TO RELATED APPLICATION

This patent application claims the benefit and priority of Chinese Patent Application No. 202410756556.7, filed with the China National Intellectual Property Administration on Jun. 13, 2024, the disclosure of which is incorporated by reference herein in its entirety as part of the present application.

TECHNICAL FIELD

The present disclosure relates to the technical field of structural health monitoring, and in particular, to a method and an apparatus for arranging a sparse sensor embedded with physical information, a device, and a storage medium.

BACKGROUND

With the acceleration of urbanization, there is an increasing amount of urban transportation infrastructure. How to accurately and effectively monitor and evaluate a health status of transportation infrastructure is an important issue in ensuring safety and smoothness of urban transportation. Structural health monitoring is a field that utilizes various sensors and data analysis methods to monitor and evaluate performance and a safety status of an engineering structure in a real-time, dynamic, comprehensive, and accurate manner.

Building an efficient and reasonable sensor network is a primary step in the structural health monitoring. A monitoring system observes a change in a structural system over time by regularly collecting and analyzing dynamic response data of a sensor array arranged for structural optimization, extracts a damage sensitive eigenvalue, and determines a structural status through data analysis. Because a large-scale structure has numerous degrees of freedom and complex dynamic characteristics, and is limited by an actual monitoring condition and monitoring cost of engineering and other factors, a sensor can only be arranged in a very limited position. A reasonable position for arranging the sensor can enhance reliability and credibility of data collection for the urban transportation infrastructure, provide effective support for structural design, maintenance, upkeep, and operation of the urban transportation infrastructure, improve structural performance and safety of the urban transportation infrastructure, and optimize structural management and services of the urban transportation infrastructure.

Optimized arrangement methods for the sensor can be divided into a single-objective optimization method, a multi-objective optimization method, and an optimization method using a genetic algorithm. The single-objective optimization method generally has shortcomings such as an inability to mutually meet a requirement, falling into a local optimum in optimization, and low optimization efficiency. The multi-objective optimization method generally converts a multi-objective optimization problem into a single-objective optimization problem by combining simple mathematical operations, and ignores a magnitude difference between single objectives, making it difficult to ensure accuracy and convergence of an optimization algorithm. The optimization method using the genetic algorithm has problems such as slow convergence, susceptibility to the local optimum, and difficult parameter setting.

Therefore, the prior art has yet to be improved.

SUMMARY

A technical problem to be solved by the present disclosure is to provide a method and an apparatus for arranging a sparse sensor embedded with physical information, a device, and a storage medium in response to shortcomings in the prior art.

In order to solve the above technical problem, a first aspect of the present disclosure provides a method for arranging a sparse sensor embedded with physical information, specifically including:
  obtaining prior information of a target structure and extracting an adaptive basis matrix of the prior information;
  constructing a problem of an optimal sparse measurement matrix by using a compressed sensing method based on the adaptive basis matrix, and solving the problem of the optimal sparse measurement matrix to obtain the optimal sparse measurement matrix; and
  determining, based on the optimal sparse measurement matrix, a sensor arrangement strategy corresponding to the target structure, and arranging a sensor for the target structure based on the sensor arrangement strategy.

In the method for arranging a sparse sensor embedded with physical information, the extracting an adaptive basis matrix of the prior information specifically includes:
  extracting a feature from the prior information by using a machine learning method, to obtain the adaptive basis matrix of the prior information.

In the method for arranging a sparse sensor embedded with physical information, the extracting an adaptive basis matrix of the prior information specifically includes:
  mapping the prior information onto high-dimensional feature space by using a plurality of kernel functions, to obtain a plurality of high-dimensional feature matrices;
  performing singular value decomposition (SVD) on a corresponding high-dimensional feature matrix of each kernel function by using a kernel matrix of the kernel function, to obtain a plurality of singular value matrices, where the singular value matrices each include singular vectors corresponding to top-ranked maximum singular values of a preset quantity;
  concatenating the singular value matrices into a concatenated singular value matrix, and performing the SVD on the concatenated singular value matrix to obtain the adaptive basis matrix of the prior information.

In the method for arranging a sparse sensor embedded with physical information, the problem of the optimal sparse measurement matrix is as follows:

$$y = (C\Psi_r) \cdot s = \Theta \cdot s$$

$$s = \arg \min_{s'} \|s'\|_1, \text{ st. } y = (C\Psi_r)s'$$

where y represents a measurement state vector collected by the arranged sensor, C represents a sparse measurement matrix, $\Psi_r$ represents the adaptive basis matrix, $\Theta$ represents a matrix product of the sparse measurement matrix and the adaptive basis matrix, and s represents a sparse vector.

In the method for arranging a sparse sensor embedded with physical information, the solving the problem of the optimal sparse measurement matrix to obtain the optimal sparse measurement matrix specifically includes:

obtaining a quantity of sensors to be arranged on the target structure; and when the quantity of sensors is equal to a quantity of rows in the adaptive basis matrix, solving the problem of the optimal sparse measurement matrix by means of LU decomposition with partial pivoting to obtain the optimal sparse measurement matrix; or when the quantity of sensors is less than a quantity of rows in the adaptive basis matrix, solving the problem of the optimal sparse measurement matrix by means of SVD to obtain the optimal sparse measurement matrix.

In the method for arranging a sparse sensor embedded with physical information, the solving the problem of the optimal sparse measurement matrix by means of LU decomposition with partial pivoting to obtain the optimal sparse measurement matrix specifically includes:

H10. taking the adaptive basis matrix as a current matrix and a first column as a current column;

H20. selecting a pivot element for the current column, moving the pivot element to a target position of the current column through a row swapping operation, and recording the row swapping operation to obtain a permutation matrix $P_1$, where the pivot element is an element with a largest absolute value among elements with a quantity of rows greater than or equal to a quantity of columns;

H30. changing an element below the moved pivot element of the current column to 0 through an elimination operation to obtain an eliminated matrix $A_1$, and recording the elimination operation to obtain an elimination matrix $L_1$;

H40. taking the eliminated matrix $A_1$ as a current matrix and a second column as a current column, and repeating the steps H10 to H30 to obtain a permutation matrix $P_2$, an eliminated matrix $A_2$, and an elimination matrix $L_2$; and repeating the steps H10 to H30 for a last column to obtain a permutation matrix $P_n$, an eliminated matrix $A_n$, and an elimination matrix $L_n$, where n represents a quantity of columns in the adaptive basis matrix;

H50. determining a lower triangular matrix L based on the obtained elimination matrix $L_1$ to the obtained elimination matrix $L_n$, determining an upper triangular matrix U based on the eliminated matrix $A_n$, and determining a permutation matrix P based on the obtained permutation matrix $P_1$ to the obtained permutation matrix $P_n$, where a product of the upper triangular matrix U and the lower triangular matrix L is equal to a product of the permutation matrix P and an adaptive basis matrix A; and H60. selecting top-ranked rows of a preset quantity in the permutation matrix P to obtain the optimal sparse measurement matrix.

In the method for arranging a sparse sensor embedded with physical information, the solving the problem of the optimal sparse measurement matrix by means of SVD to obtain the optimal sparse measurement matrix specifically includes:

performing the SVD on a transposed matrix of the adaptive basis matrix to obtain a left singular vector matrix;

taking a singular vector ranked first by singular value in the left singular vector matrix as a target singular vector, and taking the transposed matrix of the adaptive basis matrix as a target transposed matrix;

projecting each column vector in the target transposed matrix onto a singular vector in the left singular vector matrix to obtain a coefficient component set corresponding to each column vector;

determining a closest column vector of the target singular vector based on the coefficient component set corresponding to each column vector, and removing an element closest to the column vector in the target transposed matrix to obtain an intermediate matrix; and taking a next singular vector of the target singular vector as the target singular vector through the singular value ranking, taking the intermediate matrix as the target transposed matrix, and repeating the step of projecting each column vector in the target transposed matrix onto the singular vector in the left singular vector matrix until a final singular vector is determined, to obtain the optimal sparse measurement matrix.

A second aspect of the present disclosure provides a computer-readable storage medium, where the computer-readable storage medium stores at least one program, and the at least one program is capable of being executed by at least one processor to implement steps of the method for arranging a sparse sensor embedded with physical information described in any one of the above statements.

A third aspect of the present disclosure provides a terminal device, including a processor and a memory, where the memory stores a computer-readable program that is capable of being executed by the processor; and the processor executes the computer-readable program to implement steps of the method for arranging a sparse sensor embedded with physical information described in any one of the above statements.

Beneficial effects: Compared with the prior art, the present disclosure provides a method and an apparatus for arranging a sparse sensor embedded with physical information, and a device. The method obtains prior information of a target structure and extracts an adaptive basis matrix of the prior information; constructs a problem of an optimal sparse measurement matrix by using a compressed sensing method based on the adaptive basis matrix, and solves the problem of the optimal sparse measurement matrix to obtain the optimal sparse measurement matrix; and determines, based on the optimal sparse measurement matrix, a sensor arrangement strategy corresponding to the target structure, and arranges a sensor for the target structure based on the sensor arrangement strategy. The embodiments of the present disclosure can use the compressed sensing method to determine the optimal sparse measurement matrix, such that data collected by each sensor has a greatest correlation for solving a specific problem. This improves accuracy of the sensor arrangement strategy, avoids information redundancy and resource waste, more efficiently utilizes limited sensor resources, and reduces a quantity of sensors required to monitor the target structure, thereby reducing a total cost of a system.

BRIEF DESCRIPTION OF THE DRAWINGS

To describe the technical solutions in the embodiments of the present disclosure more clearly, the accompanying drawings required for describing the embodiments are briefly described below. Apparently, the accompanying drawings in the following description show merely some embodiments of the present disclosure, and those of ordinary skill in the art may still derive other accompanying drawings from these drawings without creative efforts.

DETAILED DESCRIPTION OF THE EMBODIMENTS

The embodiments of the present disclosure provide a method and an apparatus for arranging a sparse sensor embedded with physical information, a device, and a storage medium. To make the objectives, technical solutions, and effects of the present disclosure clearer, the following describes the present disclosure in more detail with reference to accompanying drawings and embodiments. It should be understood that specific embodiments described herein are merely used to explain the present disclosure, rather than to limit the present disclosure.

Those skilled in the art can understand that, unless otherwise stated, the singular forms "a", "an", "said", and "the" used herein may also include plural forms. It should be further understood that the term "comprising/including" used in the specification of the present disclosure refers to the presence of the described features, integers, steps, operations, elements, and/or components, but does not exclude the presence or addition of one or more other features, integers, steps, operations, elements, components, and/or groups thereof. It should be understood that when an element is "connected" or "coupled" to another element, it can be connected or coupled to the another element directly or through an intermediate element. In addition, "connection" or "coupling" used herein may include wireless connection or coupling. The term "and/or" used herein includes all or any one of one or more associated listed items and all combinations of the one or more associated listed items.

Those skilled in the art should understand that, unless otherwise defined, all terms (including technical terms and scientific terms) used herein have the same meaning as those commonly understood by those of ordinary skill in the art to which the present disclosure belongs. It should also be understood that terms such as those defined in general dictionaries should be understood as having meanings consistent with the meanings in the context of the prior art, and unless otherwise defined herein, these terms will not be explained in ideal or overly-formal meanings.

It should be understood that the serial number of each step in the embodiments does not indicate an order of performing the step. An order of performing each step is determined by its function and internal logic, and should not limit an implementation process of the embodiments of the present disclosure.

Content in the present disclosure will be further described below by describing the embodiments with reference to the accompanying drawings.

An embodiment of the present disclosure provides a method for arranging a sparse sensor embedded with physical information. The method can be applied to many fields such as fluid mechanics, control, aerospace, and civil engineering to arrange a sensor system for a target structure in the above fields, or optimize a sensor system already arranged in the target structure.

Figure 1:
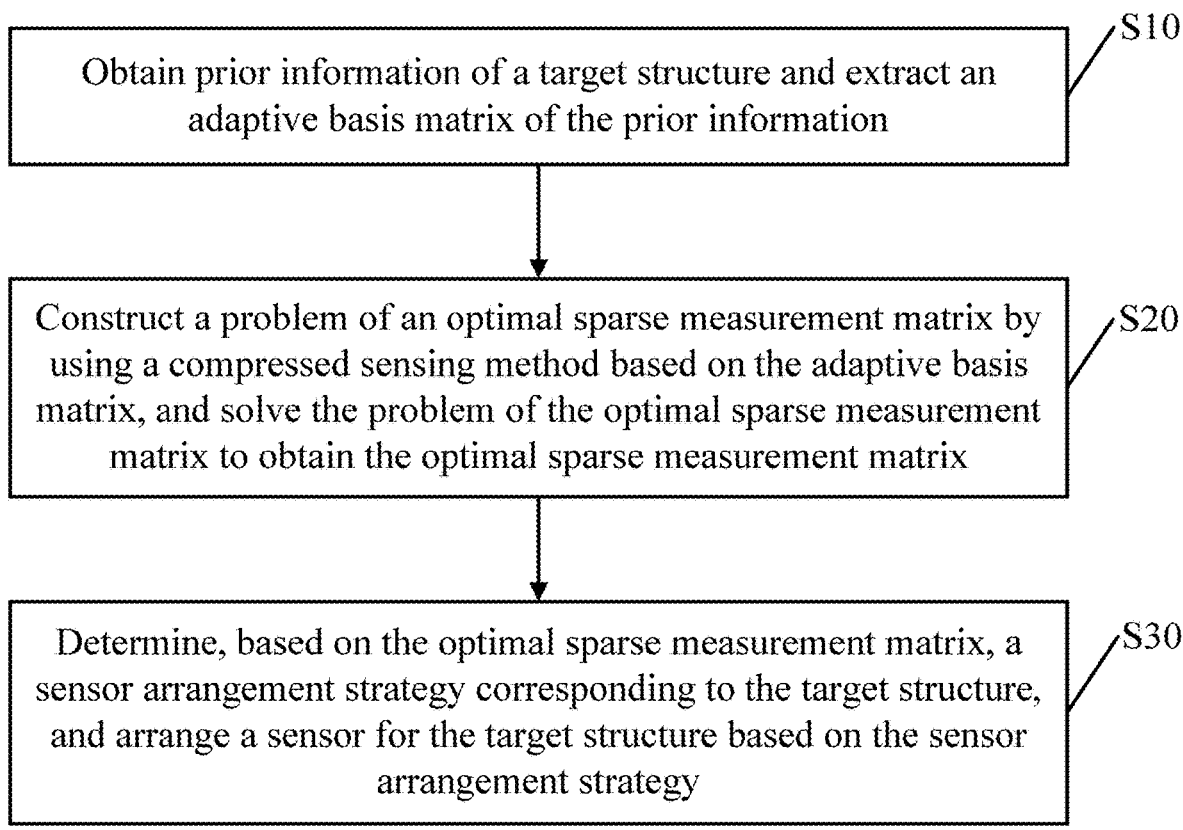
FIG. 1 is a flowchart of a method for arranging a sparse sensor embedded with physical information according to an embodiment of the present disclosure.
Figures 2, 3:
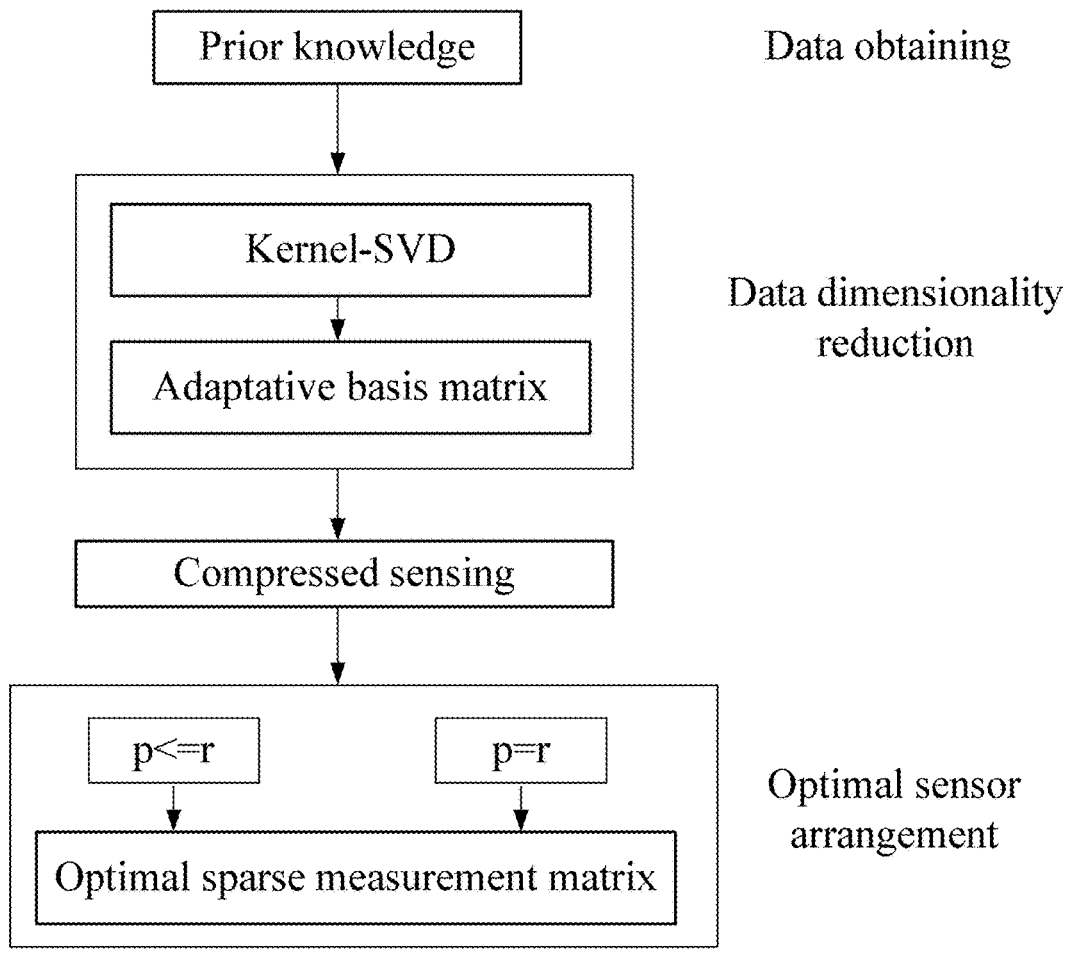
FIG. 2 is a technical roadmap of a method for arranging a sparse sensor embedded with physical information according to an embodiment of the present disclosure.
FIG. 3 is a schematic diagram of SVD.
Figure 4A:
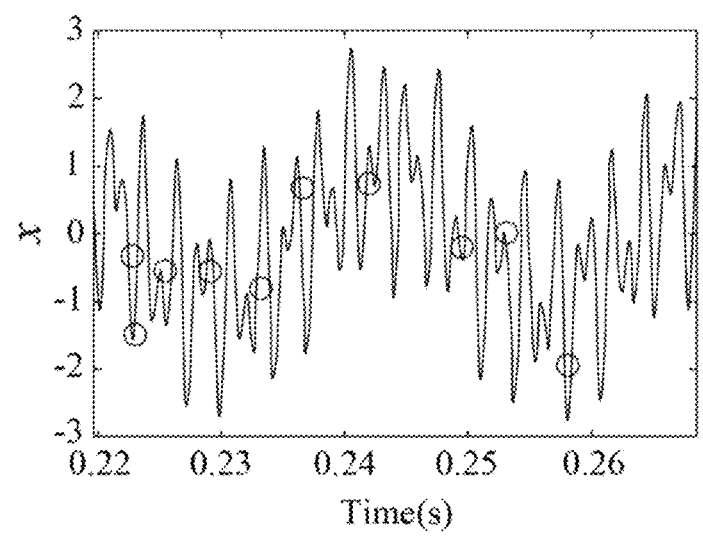
FIGS. 4A-4D are schematic diagrams of an example of reconstructing a one-dimensional signal through compressed sensing.
Figure 4B:
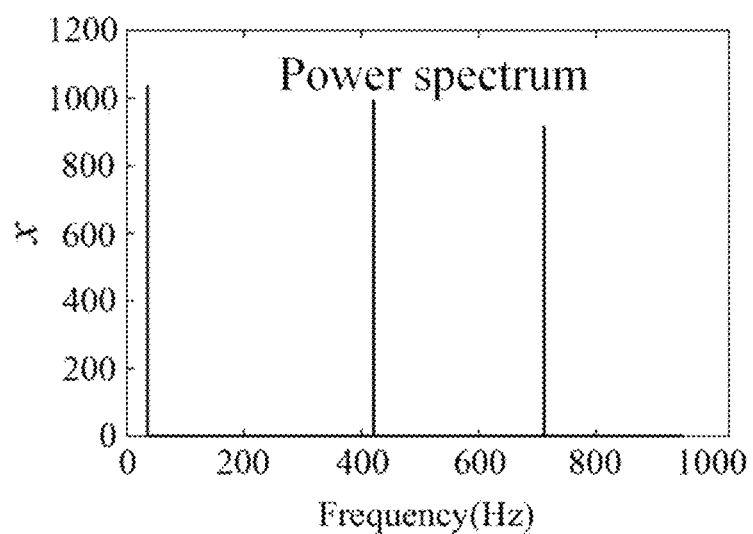
Figure 4C:
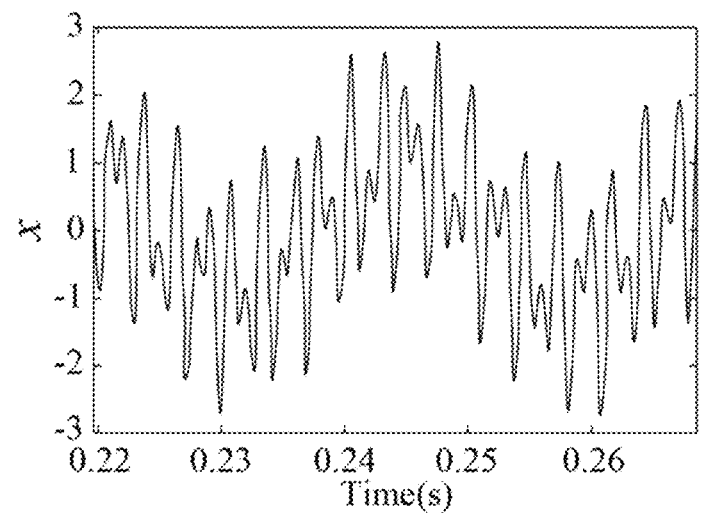
Figure 4D:
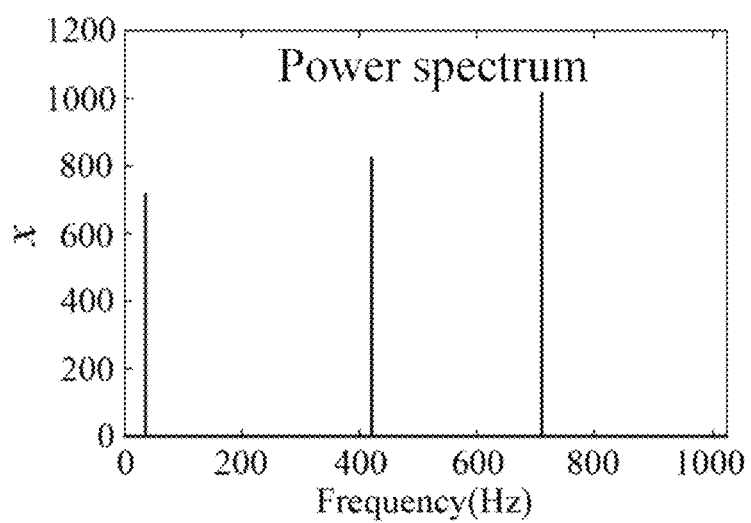

As shown FIG. 1, FIG. 2, the method for arranging a sparse sensor embedded with physical information provided in this embodiment of the present disclosure specifically includes the following steps:

Step S10. Obtain prior information of a target structure and extract an adaptive basis matrix of the prior information.

Specifically, the target structure may be a structure for which a sensor is to be arranged, such as a bridge, a building, a large machinery, and other structures. The prior information is dynamic response data of the target structure, such as acceleration data and impact load data. In addition, the prior information may include a plurality of pieces of known dynamic response data, and the plurality of pieces of known dynamic response data may cover different working conditions of the target structure, such as bearing different impact loads and experiencing varying degrees of loss.

The prior information can be obtained based on historical data of the target structure or through finite element simulation. In this embodiment of the present disclosure, the prior information is obtained through a finite element model (FEM). That is, an FEM for a structural manifestation is established for the target structure, the dynamic response data of the target structure is collected by using finite element software, and the collected dynamic response data is used as the prior information. For example, assuming the target structure is the bridge, dynamic response data of the bridge is the acceleration data, which reflects responses of various positions of the bridge to external incentives such as a traffic load and an environmental factor. Therefore, an FEM of the bridge is first established, and then the acceleration data of the bridge is collected by using the finite element software, to obtain the prior information.

In addition, to ensure data quality of the prior information, the prior information can be preprocessed after being collected. The preprocessing may include denoising, normalization, outlier processing, and the like. The denoising is used to remove background noise, the normalization is used to unify a data scale, and the outlier processing is used to eliminate an outlier in the data.

The adaptive basis matrix is used to reflect a potential structure and an intrinsic change of the prior information, and can be determined based on an information structure or a sparsity feature of the prior information to improve collection efficiency and reconstruction accuracy. A machine learning algorithm (such as Autoencoder or PCA) is used to reduce a dimensionality of the prior information to retain only important information to extract a low-dimensional feature of the prior information, and the extracted low-dimensional feature is used as the adaptive basis matrix. That is, the extracting an adaptive basis matrix of the prior information may specifically be extracting a feature from the prior information by using the machine learning method, to obtain the adaptive basis matrix of the prior information. The machine learning method performs feature extraction and dimensionality reduction on a pattern and a structure in the data based on a data-driven low-dimensional representation method, and projects high-dimensional data into low-dimensional space. This effectively simplifies the data, reduces computational complexity, improves efficiency of data analysis, and reveals an inherent mechanism of the system.

In a specific implementation, kernel singular value decomposition (kernel-SVD) is used to determine the adaptive basis matrix of the prior information. The kernel-SVD is a method for performing the dimensionality reduction on the high-dimensional data. The prior information is mapped onto higher-dimensional or infinite-dimensional feature space through a kernel trick, and then SVD is performed in the feature space. In this way, the dimensionality reduction and the feature extraction are achieved, and a nonlinear structure of the prior information is preserved. Based on this, the extracting an adaptive basis matrix of the prior information specifically includes the following steps:

S11. Map the prior information onto high-dimensional feature space by using a plurality of kernel functions, to obtain a plurality of high-dimensional feature matrices.

S12. Perform the SVD on a corresponding high-dimensional feature matrix of each kernel function by using a kernel matrix of the kernel function, to obtain a plurality of singular value matrices, where the singular value matrices each include singular vectors corresponding to top-ranked maximum singular values of a preset quantity.

S13. Concatenate the singular value matrices into a concatenated singular value matrix, and perform the SVD on the concatenated singular value matrix to obtain the adaptive basis matrix of the prior information.

Specifically, the prior information may include a plurality of pieces of dynamic response data, and each piece of dynamic response data includes a plurality of features. Correspondingly, the prior information can be represented as a data matrix $X \in R^{n \times m}$, where m represents a data amount of the dynamic response data, and n represents a data amount of the features included in the dynamic response data. Each of the kernel functions is preset to map each piece of dynamic response data in the prior information onto the high-dimensional feature space to obtain a high-dimensional feature matrix corresponding to the prior information. The kernel functions may be different. The kernel function $k(x,y)=\phi(x)^T\phi(y)$ may be seen as an implicit representation of a nonlinear mapping $\phi(\bullet):\phi(\bullet):R^n \to R^d (d>>n)$, where d represents a dimension of the high-dimensional feature space. The present disclosure uses the kernel function to implicitly represent the nonlinear mapping $\phi(\bullet)$, which can avoid a "curse of dimensionality" in the high-dimensional feature space. In addition, the kernel function can be set based on an actual need, for example, a Gaussian kernel is used.

Thus, by presetting the kernel function and the data matrix X, a high-dimensional feature matrix $\phi(X)$ in the high-dimensional feature space can be obtained, where the $\phi(X)$ can be expressed as follows:

$$\phi(X)=[\phi(x_1),\phi(x_2),\ldots,\phi(x_m)]$$

As described above, $\phi(X) \in R^{d \times m}$, where d represents the dimension of the high-dimensional feature space, and m represents the data amount of the dynamic response data.

A preset kernel matrix may be preset, or may be determined based on the preset kernel function. In this embodiment of the present disclosure, the preset kernel matrix is determined based on the preset kernel function, and can be represented as follows:

$$K=\phi(X)[\phi(X)]^T, K_{ij}=k(x_i,x_j)$$

As described above, K represents the preset kernel matrix, $x_i$ represents an $i^{th}$ piece of dynamic response data in the data matrix X, and $x_j$ represents a $j^{th}$ piece of dynamic response data in the data matrix X.

In addition, it should be noted that since the adaptive basis matrix is an adaptive basis of the dynamic response data x, the $\phi(\bullet)$ implied by the kernel function is a mapping of $R^n \to R^n$.

After the high-dimensional feature matrix is obtained, as shown in FIG. 3, an eigenvalue and an eigenvector of the preset kernel matrix K can be used to decompose the high-dimensional feature matrix $\phi(X)$ into a product of three matrices, including a left singular matrix U, a singular value matrix Σ, and a right singular matrix V, where $\phi(X)=U\Sigma V^T$. Then, through singular value ranking, top-ranked maximum singular values of a preset quantity r and corresponding singular vectors can be retained to obtain the singular value matrix, thereby achieving the dimensionality reduction and the feature extraction for the data.

The preset quantity r may be preset. Alternatively, a quantity r' of singular values to be retained may be selected based on a cumulative energy ratio of the singular values in the obtained singular vectors of the preset quantity. A method for determining the r' may be as follows:

$$r' = \underset{k}{\mathrm{argmin}}\left(\frac{\sum_{i=1}^{k}\sigma_i}{\sum_{i=1}^{r}\sigma_i} \geq p\right)$$

As described above, k represents a positive integer from 1 to r, $\sigma_i$ represents an $i^{th}$ singular value, and P represents a preset percentage, for example, P=95%.

Correspondingly, the high-dimensional feature matrix $\phi(X)$ can be approximately represented as $\phi(X)_{r'}$, namely, $\phi(X) \approx (X)_{r'} = U_{r'}\Sigma_{r'}V_{r'}^T$, where $U_{r'} \in R^{n \times r'}$, $\Sigma_{r'} \in R^{r' \times r'}$, and $V_{r'}^T \in R^{r' \times m}$ represents a matrix composed of the first r' singular vectors of the U, the Σ, and the $V^T$.

Further, the obtained singular value matrices can be concatenated into one concatenated singular value matrix. Then, the concatenated singular value matrix is subjected to SVD, and the first r column vectors in the left singular value matrix are selected as the adaptive basis matrix. Herein, the adaptive basis matrix is denoted as $\Psi_r \in R^{n \times r}(n>>r)$. Certainly, in a practical application, it is also possible to select a variance of the preset percentage from the obtained singular vectors of the preset quantity as the quantity of singular values to be retained, and then the adaptive basis matrix is updated.

In addition, it should be noted that in other implementations, the kernel functions may only include one kernel function. After the singular value matrix is determined based on the one kernel function, the adaptive basis matrix can be determined based on the singular value matrix.

S20. Construct a problem of an optimal sparse measurement matrix by using a compressed sensing method based on the adaptive basis matrix, and solve the problem of the optimal sparse measurement matrix to obtain the optimal sparse measurement matrix.

Specifically, the compressed sensing method is a method for reconstructing raw data using a sparse signal sampling technique, which assumes that a signal can be represented as a sparse vector in a transform domain. Therefore, a state vector x of a nonlinear dynamic system $\dot{x}=f(x(t))$ may have a sparse representation in a general adaptive basis matrix $\Psi_r \in R^{n \times n}$ (such as Fourier or Wavelet basis):

$$x=\Psi \cdot s \quad (1)$$

As described above, $s \in R^n$ represents one sparse vector, which indicates that the x is composed of which column vectors in the $\Psi_r \in R^{n \times n}$.

A sparse measurement matrix is used to reconstruct the state vector x, which means that the state vector x can be reconstructed through the sparse measurement matrix $C \in R^{q \times n}$ ($n \gg q$);

$$y = C \cdot x \quad (2)$$

As described above, $y \in R^q (q \ll n)$ represents a state vector obtained from a complex dynamic system through sensor monitoring. The sparse measurement matrix C is determined based on a position of an arranged sensor, that is, an optimal position of arranging the sensor can be determined by determining the sparse measurement matrix C.

Figure 5:
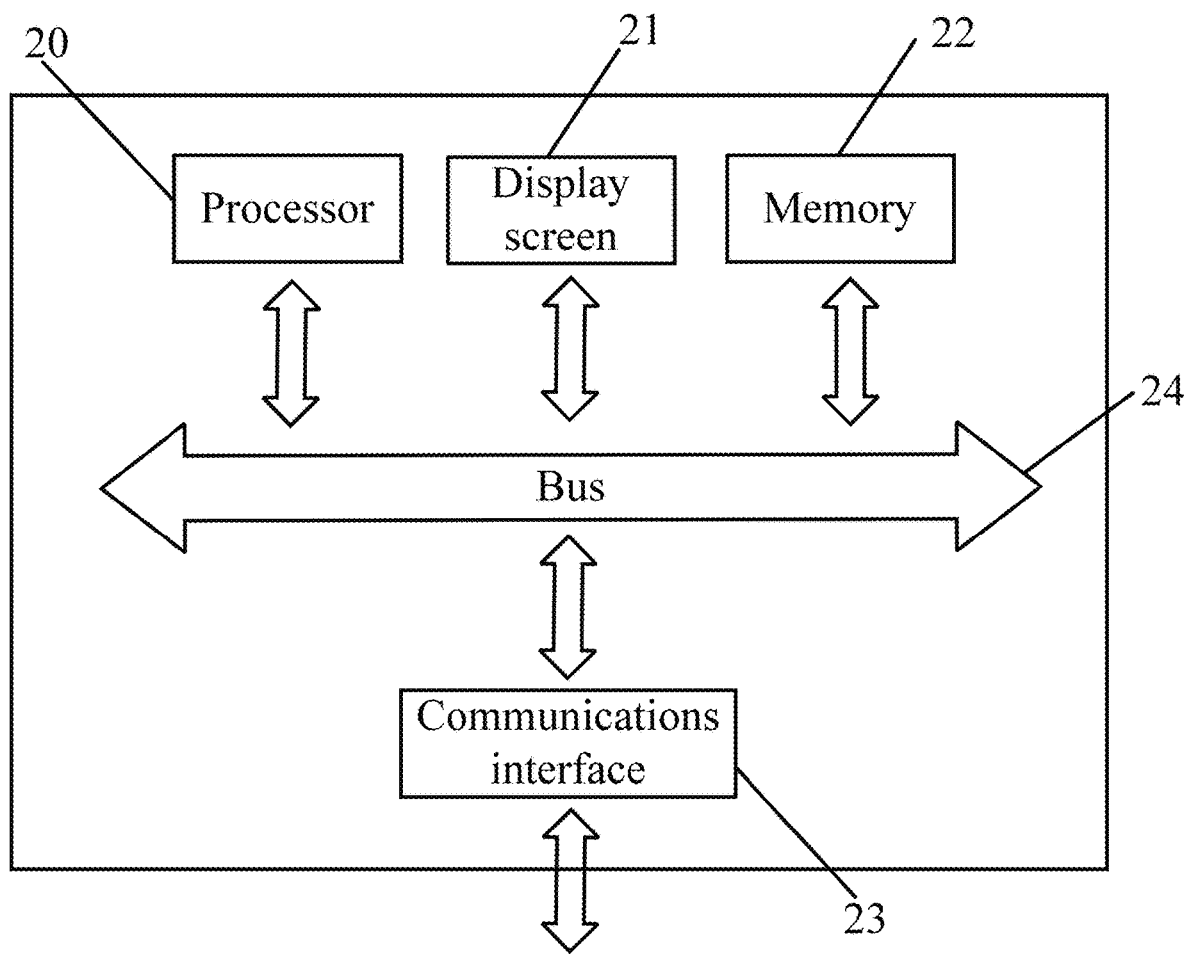
FIG. 5 is a structural schematic diagram of a terminal device according to an embodiment of the present disclosure.

Further, as shown in FIG. 5, the following can be obtained by combining (1) and (2):

$$y = (C\Psi) \cdot s = \Phi \cdot s \quad (3)$$

As described above, $\Phi = C\Psi \in R^{q \times n}$. A solving framework for compressed sensing is shown in FIG. 1.

When $q < n$, (3) is an underdetermined equation with an infinite quantity of solutions. However, due to an assumption that a signal collected by the sensor has sparsity, a sparsest s can be found to satisfy the following condition:

$$s = \arg \min_{s'} \|s'\|_0, \text{ st. } y = (C\Psi)s' \quad (4)$$

Thus, the equation (3) is solved, where $\|s'\|_0$ represents a quantity of non-zero elements in s'. A key to successful compressed sensing lies in its theoretical proof that if the measurement matrix C satisfies a constraint, a $l_0$-norm non-convex optimization problem in the formula (4) can be relaxed into an $l_1$-norm convex optimization problem expressed in a formula (5), thereby greatly accelerating problem solving:

$$s = \arg \min_{s'} \|s'\|_1, \text{ st. } y = (C\Psi)s' \quad (5)$$

As described above, $$\|s'\|_1 = \sum_{k=1}^{n} s_k.$$

According to the theory of the compressed sensing, in order to utilize an $l_1$-norm with a high probability to solve a linear equation set expressed by the equation (3) to obtain the sparse vector s, so as to reconstruct the complete system state vector x, the matrix $\Phi = C\Psi$ must satisfy a restricted isometric property (RIP):

$$(1-\delta_k)\|x\|_2^2 \leq \|C\Psi s\|_2^2 \leq (1+\delta_k)\|x\|_2^2 \quad (6)$$

As described above, $\delta_k$ represents a minimum value which makes the above inequality true for all sparse vectors s. When the $\delta_k$ is small, the matrix $C\Psi$ behaves approximately as a near-isometry on the sparse vector s. When the RIP is satisfied, it means that a geometric structure of the sparse vector S is preserved by the matrix $C\Psi$. Specifically, for all the sparse vectors S, conditions for making the sparse measurement matrix C satisfy the RIP are as follows:

1) The sparse measurement matrix q is uncorrelated with the adaptive basis matrix $\Psi$, which means that a row vector in the sparse measurement matrix C is uncorrelated with a column of the adaptive basis matrix $\Psi$.
2) The measurement quantity q is large enough, with an order of magnitude being $q \approx k_1 K \log(n/K)$. The constant $k_1$ depends on a degree of non-correlation between the C and the $\Psi$, and K depends on sparsity of the S.

The above two conditions ensure that the matrix $C\Psi$ has an approximately unitary transformation effect on the sparse vector s and maintain a relative distance between vectors, thereby ensuring that signal reconstruction can almost always be performed using an $l_1$-norm convex optimization algorithm. For example, FIGS. 4A-4D show an example of reconstructing a one-dimensional signal through the compressed sensing.

In this embodiment of the present disclosure, because the prior information is known, that is, the state vector of the nonlinear dynamic system corresponding to the target structure is known, and the adaptive basis matrix of the state vector is obtained, the sparse measurement matrix C can be obtained through reverse solving by using a theoretical framework of the compressed sensing. Therefore, the problem of the optimal sparse measurement matrix can be constructed based on the compressed sensing method. The problem of the optimal sparse measurement matrix may be expressed as follows:

$$y = (C\Psi_r) \cdot s = \ominus \cdot s$$

$$s = \arg \min_{s'} \|s'\|_1, \text{ st. } y = (C\Psi_r)s'$$

As described above, Y represents a measurement state vector collected by the arranged sensor, C represents the sparse measurement matrix, $\Psi_r$ represents the adaptive basis matrix, $\ominus$ represents a matrix product of the sparse measurement matrix and the adaptive basis matrix, and s represents the sparse vector.

The optimal sparse measurement matrix is used to determine the optimal position of arranging the sensor to minimize information redundancy and achieve high-quality signal reconstruction based on sparsity and structural performance of the signal within the adaptive basis matrix, thereby improving efficiency of signal recovery. As shown in FIGS. 4A-4D, a problem of solving the optimal sparse measurement matrix is how to select a row vector in the $\Psi_r$. When the $\Psi_r$ is constructed, the first r singular vectors are selected. Therefore, the $\Psi_r$ is a matrix whose rank is r. Therefore, r linearly independent row vectors (corresponding to r key measurement values) can be selected from the $\Psi_r$ and substituted into the problem of the optimal sparse measurement matrix for solving, such that complete information of the state x can be approximately obtained. If more than r row vectors are selected from the $\Psi_r$, selected row vector groups must be linearly correlated, resulting in information redundancy. When a quantity of sensors allowed to be arranged under a real condition, namely, q, is equal to r, the problem of determining the optimal sparse measurement matrix C is equivalent to selecting the r linearly independent row vectors from the $\Psi_r$.

Further, when the optimal sparse measurement matrix is solved, the r linearly independent row vectors in the adaptive basis matrix may be arbitrarily selected as the optimal sparse measurement matrix. Alternatively, the optimal sparse measurement matrix may be determined by means of LU decomposition with partial pivoting. Alternatively, the optimal sparse measurement matrix may be determined through the SVD. Alternatively, a solving method of the optimal sparse measurement matrix may be determined based on the quantity of sensors allowed to be arranged under the real condition. In this embodiment of the present disclosure, the solving method of the optimal sparse measurement matrix is determined based on the quantity of sensors allowed to be arranged under the real condition. Specifically, the solving the problem of the optimal sparse measurement matrix to obtain the optimal sparse measurement matrix specifically includes:

obtaining a quantity of sensors to be arranged on the target structure; and when the quantity of sensors is equal to a quantity of rows in the adaptive basis matrix, solving the problem of the optimal sparse measurement matrix by means of LU decomposition with partial pivoting to obtain the optimal sparse measurement matrix; or when the quantity of sensors is less than a quantity of rows in the adaptive basis matrix, solving the problem of the optimal sparse measurement matrix by means of the SVD to obtain the optimal sparse measurement matrix.

Specifically, the quantity of sensors to be arranged on the target structure is a quantity of sensors allowed to be arranged on the target structure, namely, a quantity of sensors required to be arranged on the target structure. When the quantity of sensors is equal to a quantity of columns in the adaptive basis matrix, due to a small computational amount of the decomposition with partial pivoting, the decomposition with partial pivoting can be used to solve the problem of the optimal sparse measurement matrix to obtain the optimal sparse measurement matrix. When the quantity of sensors is less than the quantity of columns in the adaptive basis matrix, due to the fact that the solving problem of the optimal sparse measurement matrix is an under equation solving problem, as well as accuracy of the SVD, the problem of the optimal sparse measurement matrix can be solved by means of the SVD to obtain the optimal sparse measurement matrix. Certainly, in a practical application, when the quantity of sensors is equal to the quantity of columns in the adaptive basis matrix, the problem of the optimal sparse measurement matrix can also be solved by means of the SVD to obtain the optimal sparse measurement matrix.

In an implementation, the solving the problem of the optimal sparse measurement matrix by means of LU decomposition with partial pivoting to obtain the optimal sparse measurement matrix specifically includes the following steps:

H10. Take the adaptive basis matrix as a current matrix and a first column as a current column.

H20. Select a pivot element for the current column, move the pivot element to a target position of the current column through a row swapping operation, and record the row swapping operation to obtain a permutation matrix $P_1$, where the pivot element is an element with a largest absolute value among elements with a quantity of rows greater than or equal to a quantity of columns.

H30. Change an element below the moved pivot element of the current column to 0 through an elimination operation to obtain an eliminated matrix $A_1$, and record the elimination operation to obtain an elimination matrix $L_1$.

H40. Take the eliminated matrix $A_1$ as a current matrix and a second column as a current column, and repeat the steps H10 to H30 to obtain a permutation matrix $P_2$, an eliminated matrix $A_2$, and an elimination matrix $L_2$; and repeat the steps H10 to H30 for a last column to obtain a permutation matrix $P_n$, an eliminated matrix $A_n$, and an elimination matrix $L_n$, where n represents a quantity of columns in the adaptive basis matrix.

H50. Determine a lower triangular matrix L based on the obtained elimination matrix $L_1$ to the obtained elimination matrix $L_n$, determine an upper triangular matrix U based on the eliminated matrix $A_n$, and determine a permutation matrix P based on the obtained permutation matrix $P_1$ to the obtained permutation matrix $P_n$, where a product of the upper triangular matrix U and the lower triangular matrix L is equal to a product of the permutation matrix P and an adaptive basis matrix A.

H60. Select top-ranked rows of a preset quantity in the permutation matrix P to obtain the optimal sparse measurement matrix.

Specifically, the LU decomposition with partial pivoting is used to divide the adaptive basis matrix into one upper triangular matrix U, one lower triangular matrix L, and one permutation matrix P, such that $P \Psi_r = L U$. The LU decomposition with partial pivoting includes pivot element selection and row swapping. In each step, an element with a highest absolute value in the current column is selected as the pivot element to ensure that the selected pivot element has a sufficient size of a numerical value to reduce an error caused by a too small numerical value in a calculation process. Finally, a matrix with a potential numerical stability problem is effectively processed.

Further, the pivot element is an element with a highest absolute value among elements meeting a preset condition in the current column. The preset condition is that a quantity of rows in which the element is located is greater than or equal to a quantity of columns in which the element is located. In other words, the pivot element is an element with a highest absolute value in an element set $\{b_{ij}, i \geq j\}$. The row swapping operation is used to move a row in which the pivot element is located to a target row, where a number of the target row is equal to a number of the current column, that is, the pivot element is moved to a $b_{ii}$ position. The elimination operation is used to change all elements below the pivot element in the current column to 0. Therefore, in the eliminated matrix, the pivot element is located at a target position whose row number is equal to a column number, and all elements below the target position in the current column are 0.

After the eliminated matrix $A_1$ is obtained, the eliminated matrix $A_1$ is taken as a target matrix, the second column is taken as the current column, and the steps H10 to H30 are repeated for the second column until the last column to obtain the elimination matrix $L_1$ to the elimination matrix $L_n$, the eliminated matrix $A_1$ to the eliminated matrix $A_n$, and the permutation matrix $P_1$ to the permutation matrix $P_n$. Then, the upper triangular matrix U, the lower triangular matrix, and the permutation matrix P can be determined, and the product of the upper triangular matrix U and the lower triangular matrix L is equal to the product of the permutation matrix P and the adaptive basis matrix A. Finally, a submatrix composed of the first r rows in the permutation matrix P is selected, in other words, the optimal sparse measurement matrix is obtained.

In another implementation, the solving the problem of the optimal sparse measurement matrix by means of the SVD to obtain the optimal sparse measurement matrix specifically includes:

performing the SVD on a transposed matrix of the adaptive basis matrix to obtain a left singular vector matrix;

taking a singular vector ranked first by singular value in the left singular vector matrix as a target singular vector, and taking the transposed matrix of the adaptive basis matrix as a target transposed matrix;

projecting each column vector in the target transposed matrix onto a singular vector in the left singular vector matrix to obtain a coefficient component set corresponding to each column vector;

determining a closest column vector of the target singular vector based on the coefficient component set corresponding to each column vector, and removing an element closest to the column vector in the target transposed matrix to obtain an intermediate matrix; and taking a next singular vector of the target singular vector as the target singular vector through the singular value ranking, taking the intermediate matrix as the target transposed matrix, and repeating the step of projecting each column vector in the target transposed matrix onto the singular vector in the left singular vector matrix until a final singular vector is determined, to obtain the optimal sparse measurement matrix.

Specifically, the performing the SVD on a transposed matrix of the adaptive basis matrix is to expand the left singular vector matrix through the SVD for the transposed matrix $\Psi_r^T$ of the adaptive basis matrix. The left singular vector matrix forms a basis of the column vector in the $\Psi_r^T$ (the row vector in the r $\Psi_r$).

Further, before the column vector in the $\Psi_r^T$ is projected onto the singular vector in the left singular vector matrix, the column vector in the $\Psi_r^T$ can be normalized by using an $l_2$-norm and then projected onto the singular vector in the left singular vector matrix. Thus, the projection can be expressed as follows:

$$\frac{x_i}{\|x_i\|_2} = a_{i1}u_1 + a_{i2}u_2 + \ldots + a_{ir}u_r (i = 1, 2, \ldots, n)$$

As described above, $x_i$ represents an $i^{th}$ column vector in the $\Psi_r^T$, $u_i$ represents an $i^{th}$ singular vector ranked by singular value in the left singular vector matrix, $a_{ij}$ represents a coefficient component, and $a_{i1}+a_{i2}+ \ldots +a_{ir}=1(i=1, 2, \ldots n)$.

Therefore, coefficient components of $x_1$ are $a_{11}$, $a_{12}, \ldots, a_{1r}$, and then a coefficient component with a largest absolute value in the $a_{i1}, a_{i2}, \ldots, a_{ir}$ is selected. Based on the selected coefficient component with the largest absolute value, a column vector closest to the $u_i$ is selected from the $\Psi_r^T$. The column vector closest to the $u_1$ and selected from the $\Psi_r^T$ may be $x_{j_1}$, where $j_1$=arg max($|a_{i1}|$), corresponding to a $j_1^{th}$ row vector in the $\Psi_r$.

Further, after the closest column vector $x_{j_1}$ is selected, a $x_{j_1}$ component of each row vector in the $\Psi_r^T$ is removed by using a Gram-Schmidt method, and then the above process can be repeated to obtain a column vector closest to $u_2$, which may be $x_{j_2}$. This process is repeated to obtain a column vector closest to $u_r$, which may be $x_{j_r}$. In this way, $x_{j_1}, x_{j_2}, \ldots, x_{j_r}$ respectively corresponding to the $u_1$, the $u_2, \ldots$, and the $u_r$ are obtained. Then a matrix composed by the $x_{j_1}, x_{j_2}, \ldots, x_{j_r}$ is taken as the optimal sparse measurement matrix.

Taking two-dimensional data as an example, the $u_1$ and the $u_2$ correspond to two vectors. The above method is to find data vectors closest to $u_1$ and $u_2$ directions in the data. According to the method described above, a position of a row vector ultimately selected from the $\Psi_r$ corresponds to an element that makes up the optimal sparse measurement matrix C (according to a rule of matrix multiplication), thereby determining the optimal position of the sensor. By using the Gram Schmidt method, it can be ensured that the selected row vector in the $\Psi_r$ is linearly independent, to improve robustness of monitoring data and efficiency of information obtaining.

Step S30. Determine, based on the optimal sparse measurement matrix, a sensor arrangement strategy corresponding to the target structure, and arrange the sensor for the target structure based on the sensor arrangement strategy.

Specifically, after the optimal sparse measurement matrix is obtained, each row vector in the optimal sparse measurement matrix can be taken as a sensing signal that needs to be collected. Then, based on low-dimensional sensor signals collected by all sensors, a high-dimensional signal of the target structure can be restored, and the target structure can be monitored and predicted based on high-dimensional information. Therefore, after a final sparse measurement matrix is obtained, the position of arranging the sensor on the target structure can be determined based on the sparse measurement matrix, and the sensor arrangement strategy corresponding to the target structure can be obtained. Then, in a practical arrangement process, the sensor can be arranged for the target structure based on the sensor arrangement strategy.

In conclusion, this embodiment provides a method for arranging a sparse sensor embedded with physical information. The method obtains prior information of a target structure and extracts an adaptive basis matrix of the prior information; constructs a problem of an optimal sparse measurement matrix by using a compressed sensing method based on the adaptive basis matrix, and solves the problem of the optimal sparse measurement matrix to obtain the optimal sparse measurement matrix; and determines, based on the optimal sparse measurement matrix, a sensor arrangement strategy corresponding to the target structure, and arranges a sensor for the target structure based on the sensor arrangement strategy. This embodiment of the present disclosure can use the compressed sensing method to determine the optimal sparse measurement matrix, such that data collected by each sensor has a greatest correlation for solving a specific problem. This improves accuracy of the sensor arrangement strategy, avoids information redundancy and resource waste, more efficiently utilizes limited sensor resources, and reduces a quantity of sensors required to monitor the target structure, thereby reducing a total cost of a system.

In order to further illustrate the method for arranging a sparse sensor embedded with physical information provided in this embodiment of the present disclosure, the following provides description by using an example of performing optimized arrangement on a position of an acceleration monitoring sensor that needs to be arranged for a bridge.

Firstly, dynamic responses of the bridge under external factors such as a normal traffic load, a wind load, and a temperature change are simulated using an FEM, to obtain dynamic response data including model calculation results such a strain and an acceleration. All dynamic response data obtained through the simulation is used as prior information.

Secondly, the prior information is denoised to remove background noise and normalized to unify a data scale. In addition, outlier processing is performed to eliminate an outlier in the data.

Thirdly, kernel-SVD is applied, a Gaussian kernel is selected as a kernel function to map the prior information from original space onto high-dimensional feature space, and SVD is performed in the high-dimensional space to reveal a nonlinear feature and a potential low-rank structure in the data, so as to obtain an adaptive basis matrix. The adaptive basis matrix preserves the first several singular values of a main variant in the prior information and their corresponding singular vectors to form a low-dimensional representation of the prior information.

Finally, based on the adaptive basis matrix obtained through the kernel-SVD, an optimal sparse measurement matrix is determined by means of the SVD or LU decomposition with partial pivoting. When the optimal sparse measurement matrix is determined, a row vector in the adaptive basis matrix is analyzed to select a position with a maximum projection weight in the adaptive basis matrix to arrange the sensor. This can ensure that the deployed sensor can capture most important information in a response of the bridge to a greatest extent, thereby improving efficiency and accuracy of a monitoring system. In addition, fewer sensors can be used to capture a critical dynamic response of the bridge.

Moreover, after the critical dynamic response is obtained, bridge information can be reconstructed based on the critical dynamic response, such that a complete state scene of the bridge can be effectively restored. This can further accurately evaluate a structural health status of the bridge, and identify a potential damage or problem area in a timely manner. This not only significantly improves the efficiency and accuracy of the monitoring system, but also greatly reduces an operating cost by using a data-driven method and a theoretically guided strategy, thereby optimizing resource utilization efficiency while ensuring safety of the bridge.

Based on the above method for arranging a sparse sensor embedded with physical information, the embodiments provide a computer-readable storage medium. The computer-readable storage medium stores at least one program, and the at least one program can be executed by at least one processor to implement steps of the method for arranging a sparse sensor embedded with physical information described in the above embodiment.

Based on the above method for arranging a sparse sensor embedded with physical information, the present disclosure further provides a terminal device. As shown in FIG. 5, the terminal device includes at least one processor 20, a display screen 21, and a memory 22, and may further include a communications interface 23 and a bus 24. The processor 20, the display screen 21, the memory 22, and the communications interface 23 can be communicated with one another by using the bus 24. The display screen 21 is configured to display a user guidance interface preset in an initial setting mode. The communications interface 23 can transmit information. The processor 20 can invoke a logic instruction in the memory 22 to execute the method in the above embodiment.

Besides, the logic instruction in the memory 22 may be implemented as a software function unit and be stored in a computer-readable storage medium when sold or used as a separate product.

The memory 22, as a computer-readable storage medium, may be configured to store a software program and a computer executable program, such as a program instruction/module corresponding to the method in the embodiments of the present disclosure. The processor 20 runs the software program, instruction, and module stored in the memory 22, to execute various functional applications and data processing, that is, implement the method in the above embodiment.

The memory 22 may mainly include a program storage area and a data storage area. The program storage area may store an operating system, and an application required by at least one function. The data storage area may store data that is created based on use of the terminal device, and the like.

In addition, the memory 22 may include a high-speed random access memory (RAM), and may further include a non-volatile memory, for example, a plurality of media that can store program code, such as a USB flash disk, a mobile hard disk, a read-only memory (ROM), a RAM, a magnetic disk, or an optical disk. The memory 22 may alternatively be a transient storage medium.

Besides, a specific process in which the processor loads and executes a plurality of instructions in the above storage medium and terminal device has been explained in detail in the above method, and details are not described herein again.

Finally, it should be noted that the foregoing embodiments are merely used to explain the technical solutions of the present disclosure, but are not intended to limit the same. Although the present disclosure is described in detail with reference to the foregoing embodiments, those of ordinary skill in the art should understand that they can still modify the technical solutions described in the foregoing embodiments, or make equivalent substitutions on some technical features therein. These modifications or substitutions do not make the essence of the corresponding technical solutions deviate from the spirit and scope of the technical solutions in the embodiments of the present disclosure.

What is claimed is:

1. A method for arranging a sparse sensor embedded with physical information, specifically comprising:

obtaining prior information of a target structure, mapping the prior information onto high-dimensional feature space by using a plurality of kernel functions, to obtain a plurality of high-dimensional feature matrices; performing singular value decomposition (SVD) on a corresponding high-dimensional feature matrix of each kernel function by using a kernel matrix of the kernel function, to obtain a plurality of singular value matrices, concatenating the singular value matrices into a concatenated singular value matrix, and performing the SVD on the concatenated singular value matrix to obtain an adaptive basis matrix of the prior information, wherein the singular value matrices each comprise singular vectors corresponding to top-ranked maximum singular values of a preset quantity;

constructing a problem of an optimal sparse measurement matrix by using a compressed sensing method based on the adaptive basis matrix, and solving the problem of the optimal sparse measurement matrix to obtain the optimal sparse measurement matrix; and determining, based on the optimal sparse measurement matrix, a sensor arrangement strategy corresponding to the target structure, and arranging a sensor for the target structure, based on the sensor arrangement strategy, to capture a critical dynamic response of the target structure;

wherein when the optimal sparse measurement matrix is determined, a row vector in the adaptive basis matrix is analyzed to select a position with a maximum projection weight in the adaptive basis matrix to arrange the sensor;

wherein the problem of the optimal sparse measurement matrix is as follows:

$$y = (C\Psi_r) \cdot s = \Theta \cdot s$$

$$s = \arg\min_{s'} \|s'\|_1, \text{ st. } y = (C\Psi_r)s'$$

wherein y represents a measurement state vector collected by the arranged sensor, C represents a sparse measurement matrix, $\Psi_r$ represents the adaptive basis matrix, $\Theta$ represents a matrix product of the sparse measurement matrix and the adaptive basis matrix, and s represents a sparse vector; and the solving the problem of the optimal sparse measurement matrix to obtain the optimal sparse measurement matrix specifically comprises:

obtaining a quantity of sensors to be arranged on the target structure; and when the quantity of sensors is equal to a quantity of rows in the adaptive basis matrix, solving the problem of the optimal sparse measurement matrix by means of decomposition with partial pivoting to obtain the optimal sparse measurement matrix; or when the quantity of sensors is less than a quantity of rows in the adaptive basis matrix, solving the problem of the optimal sparse measurement matrix by means of SVD to obtain the optimal sparse measurement matrix.

2. The method for arranging a sparse sensor embedded with physical information according to claim 1, wherein the solving the problem of the optimal sparse measurement matrix by means of decomposition with partial pivoting to obtain the optimal sparse measurement matrix specifically comprises:

H10. taking the adaptive basis matrix as a current matrix and a first column as a current column;

H20. selecting a pivot element for the current column, moving the pivot element to a target position of the current column through a row swapping operation, and recording the row swapping operation to obtain a permutation matrix $P_1$, wherein the pivot element is an element with a largest absolute value among elements with a quantity of rows greater than or equal to a quantity of columns;

H30. changing an element below the moved pivot element of the current column to 0 through an elimination operation to obtain an eliminated matrix $A_1$, and recording the elimination operation to obtain an elimination matrix $L_1$;

H40. taking the eliminated matrix $A_1$ as a current matrix and a second column as a current column, and repeating the steps H10 to H30 to obtain a permutation matrix $P_2$, an eliminated matrix $A_2$, and an elimination matrix $L_2$; and repeating the steps H10 to H30 for a last column to obtain a permutation matrix $P_n$, an eliminated matrix $A_n$, and an elimination matrix $L_n$, wherein n represents a quantity of columns in the adaptive basis matrix;

H50. determining a lower triangular matrix L based on the obtained elimination matric $L_1$ to the obtained elimination matrix $L_n$, determining an upper triangular matrix U based on the eliminated matrix $A_n$, and determining a permutation matrix P based on the obtained permutation matrix $A_n$, to the obtained permutation matrix $P_n$, wherein a product of the upper triangular matrix U and the lower triangular matrix L is equal to a product of the permutation matrix P and the adaptive basis matrix A;

H60. selecting top-ranked rows of a preset quantity in the permutation matrix P to obtain the optimal sparse measurement matrix.

3. The method for arranging a sparse sensor embedded with physical information according to claim 1, wherein the solving the problem of the optimal sparse measurement matrix by means of SVD to obtain the optimal sparse measurement matrix specifically comprises:

performing the SVD on a transposed matrix of the adaptive basis matrix to obtain a left singular vector matrix;

taking a singular vector ranked first by singular value in the left singular vector matrix as a target singular vector, and taking the transposed matrix of the adaptive basis matrix as a target transposed matrix;

projecting each column vector in the target transposed matrix onto a singular vector in the left singular vector matrix to obtain a coefficient component set corresponding to each column vector;

determining a closest column vector of the target singular vector based on the coefficient component set corresponding to each column vector, and removing an element closest to the column vector in the target transposed matrix to obtain an intermediate matrix; and taking a next singular vector of the target singular vector as the target singular vector through the singular value ranking, taking the intermediate matrix as the target transposed matrix, and repeating the step of projecting each column vector in the target transposed matrix onto the singular vector in the left singular vector matrix until a final singular vector is determined, to obtain the optimal sparse measurement matrix.

4. A terminal device, comprising a processor and a memory, wherein the memory stores a computer-readable program that is capable of being executed by the processor; and the processor executes the computer-readable program to implement steps of the method for arranging a sparse sensor embedded with physical information according to claim 1.

5. The terminal device according to claim 4, wherein the solving the problem of the optimal sparse measurement matrix by means of decomposition with partial pivoting to obtain the optimal sparse measurement matrix specifically comprises:

H10. taking the adaptive basis matrix as a current matrix and a first column as a current column;

H20. selecting a pivot element for the current column, moving the pivot element to a target position of the current column through a row swapping operation, and recording the row swapping operation to obtain a permutation matrix $P_1$, wherein the pivot element is an element with a largest absolute value among elements with a quantity of rows greater than or equal to a quantity of columns;

H30. changing an element below the moved pivot element of the current column to 0 through an elimination operation to obtain an eliminated matrix $A_1$, and recording the elimination operation to obtain an elimination matrix $L_1$;

H40. taking the eliminated matrix $A_1$ as a current matrix and a second column as a current column, and repeating the steps H10 to H30 to obtain a permutation matrix $P_2$, an eliminated matrix $A_2$, and an elimination matrix $L_2$; and repeating the steps H10 to H30 for a last column to obtain a permutation matrix $P_n$, an eliminated matrix $A_n$, and an elimination matrix $L_n$, wherein n represents a quantity of columns in the adaptive basis matrix;

H50. determining a lower triangular matrix L based on the obtained elimination matric $L_1$ to the obtained elimination matrix $L_n$, determining an upper triangular matrix U based on the eliminated matrix $A_n$, and determining a permutation matrix P based on the obtained permutation matrix $P_1$ to the obtained permutation matrix $P_n$, wherein a product of the upper triangular matrix U and the lower triangular matrix L is equal to a product of the permutation matrix P and the adaptive basis matrix A;

H60. selecting top-ranked rows of a preset quantity in the permutation matrix P to obtain the optimal sparse measurement matrix.

6. The terminal device according to claim 4, wherein the solving the problem of the optimal sparse measurement matrix by means of SVD to obtain the optimal sparse measurement matrix specifically comprises:

performing the SVD on a transposed matrix of the adaptive basis matrix to obtain a left singular vector matrix;

taking a singular vector ranked first by singular value in the left singular vector matrix as a target singular vector, and taking the transposed matrix of the adaptive basis matrix as a target transposed matrix;

projecting each column vector in the target transposed matrix onto a singular vector in the left singular vector matrix to obtain a coefficient component set corresponding to each column vector;

determining a closest column vector of the target singular vector based on the coefficient component set corresponding to each column vector, and removing an element closest to the column vector in the target transposed matrix to obtain an intermediate matrix; and taking a next singular vector of the target singular vector as the target singular vector through the singular value ranking, taking the intermediate matrix as the target transposed matrix, and repeating the step of projecting each column vector in the target transposed matrix onto the singular vector in the left singular vector matrix until a final singular vector is determined, to obtain the optimal sparse measurement matrix.

\* \* \* \* \*